US012637023B2

(12) United States Patent
Sasahara

(10) Patent No.: US 12,637,023 B2
(45) Date of Patent: May 26, 2026

(54) VEHICLE POWER SUPPLY SYSTEM

(71) Applicant: YAZAKI CORPORATION, Tokyo (JP)

(72) Inventor: Masato Sasahara, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 19/204,463

(22) Filed: May 9, 2025

(65) Prior Publication Data

US 2025/0381926 A1 Dec. 18, 2025

(30) Foreign Application Priority Data

Jun. 18, 2024 (JP) ................................. 2024-097979

(51) Int. Cl.
*B60R 16/033* (2006.01)
*B60R 16/023* (2006.01)

(52) U.S. Cl.
CPC ........ *B60R 16/033* (2013.01); *B60R 16/0232* (2013.01)

(58) Field of Classification Search
CPC ........................... B60R 16/033; B60R 16/0232
See application file for complete search history.

(56) References Cited

U.S. PATENT DOCUMENTS 10,654,430 B2 * 5/2020 Kontani ................ B60R 16/033
2021/0242712 A1 8/2021 Izawa et al.

FOREIGN PATENT DOCUMENTS

JP 7013500 B2 1/2022

* cited by examiner

*Primary Examiner* — Carlos Amaya
(74) *Attorney, Agent, or Firm* — KENEALY VAIDYA LLP

(57) ABSTRACT

A vehicle power supply system includes a control unit for controlling to turn on and off first to fourth switches. In a normal state, the control unit turns off only the third switch to supply electric power from the first power supply unit and a power storage unit to the first and second load units. When an abnormality occurs in the vehicle power supply unit or the first load unit, the control unit turns off only the first switch to supply electric power from the power storage unit to the second load unit. When an abnormality occurs in the second load unit, the control unit turns on the first and fourth switches and turns off the second and third switches to supply electric power from the vehicle power supply unit and the power storage unit to the first load unit.

4 Claims, 13 Drawing Sheets

*FIG. 2*

|  | FIRST SWITCH | SECOND SWITCH | THIRD SWITCH | FOURTH SWITCH |
|---|---|---|---|---|
| NORMAL | ON | ON | OFF | ON |
| FIRST POWER SUPPLY UNIT ABNORMALITY | OFF | ON | ON | ON |
| FIRST LOAD UNIT ABNORMALITY | OFF | ON | ON | ON |
| SECOND POWER SUPPLY UNIT ABNORMALITY | ON | ON | OFF | ON |
| SECOND LOAD UNIT ABNORMALITY | ON | OFF | OFF | ON |
| BATTERY OPEN | ON | ON | OFF | OFF |

*FIG. 8*

| | FIRST SWITCH | SECOND SWITCH | FOURTH SWITCH |
|---|---|---|---|
| NORMAL | ON | ON | ON |
| FIRST POWER SUPPLY UNIT GROUND FAULT | OFF | ON | ON |
| FIRST LOAD UNIT GROUND FAULT | OFF | ON | ON |
| SECOND LOAD UNIT GROUND FAULT | ON | OFF | ON |
| BATTERY OPEN | ON | ON | OFF |

VEHICLE POWER SUPPLY SYSTEM

CROSS-REFERENCE TO RELATED APPLICATIONS

This application is based on and claims priority under 35 USC 119 from Japanese Patent Application No. 2024-097979 filed on Jun. 18, 2024, the contents of which are incorporated herein by reference.

TECHNICAL FIELD

The present disclosure relates to a vehicle power supply system.

BACKGROUND ART

In the related art, there has been proposed a vehicle power supply system including a main power supply device that supplies electric power to a first load unit and a second load unit which are mounted on a vehicle, and a backup power supply device that supplies electric power only to the second load unit without supplying electric power to the first load unit when the main power supply device is abnormal (see, for example, Patent Literature 1).

CITATION LIST

Patent Literature

Patent Literature 1: JP7013500B

SUMMARY OF INVENTION

In the vehicle power supply system described in Patent Literature 1, the main power supply device includes, for example, a main power supply unit such as a DC/DC converter that receives power from a high-voltage battery or a generator mounted on the vehicle and performs power conversion, and a power storage unit charged by the high-voltage battery or the generator. Similarly, the backup power supply device includes a backup power supply unit such as a DC/DC converter, and a power storage unit. By being provided with a power storage unit, each power supply device can cope with a situation in which the power supply unit alone is insufficient to meet power demands, for example, at the time of load fluctuation. On the other hand, in the vehicle power supply system described in Patent Literature 1, the power storage unit is required for both the main system and the backup system, which poses a problem in terms of simplifying the configuration.

Therefore, an object of the present disclosure is to provide a vehicle power supply system with a more simplified configuration.

A vehicle power supply system according to the present disclosure supply electric power to a first load unit and a second load unit which are mounted on a vehicle. The vehicle power supply system includes a first line that connects the first load unit and a vehicle power supply unit for supplying electric power; a second line that connects the first line and the second load unit; a first switch that is arranged on the second line and that turns on and off the second line; a second switch that is arranged in series on the second line closer to the second load unit than the first switch and that turn on and off the second line; a third line that connects a power storage unit in which electric power is stored in advance and a connection point between the first switch and the second switch; and a control unit that controls the first switch and the second switch to be turned on and off. In a normal state in which it is determined that there is no abnormality in the vehicle power supply unit, the first load unit, and the second load unit, the control unit turns on the first switch and the second switch so as to supply electric power from the vehicle power supply unit and the power storage unit to the first load unit and the second load unit, in a first abnormal state in which it is determined that there is an abnormality in the vehicle power supply unit or the first load unit, the control unit turns off the first switch and turns on the second switch so as to supply electric power from the power storage unit to the second load unit, and in a second abnormal state in which it is determined that there is an abnormality in the second load unit, the control unit turns on the first switch and turns off the second switch so as to supply electric power from the vehicle power supply unit and the power storage unit to the first load unit.

According to the present disclosure, it is possible to provide a vehicle power supply system with a more simplified configuration.

BRIEF DESCRIPTION OF DRAWINGS

FIG. 2 is a table showing operation states of switches in the vehicle power supply system according to the first embodiment;

FIG. 8 is a table showing operation states of switches in the vehicle power supply system according to the second embodiment;

DESCRIPTION OF EMBODIMENTS

Hereinafter, the present disclosure will be described with reference to preferred embodiments. The present disclosure is not limited to the following embodiments, and may be appropriately modified without departing from the gist of the present disclosure. In the embodiments to be described below, there may be portions in which illustration and description of a part of a configuration are omitted, and it is needless to say that a known or well-known technique is appropriately applied to the details of an omitted technique within a range in which no contradiction with the contents to be described below occurs.

Figure 1:
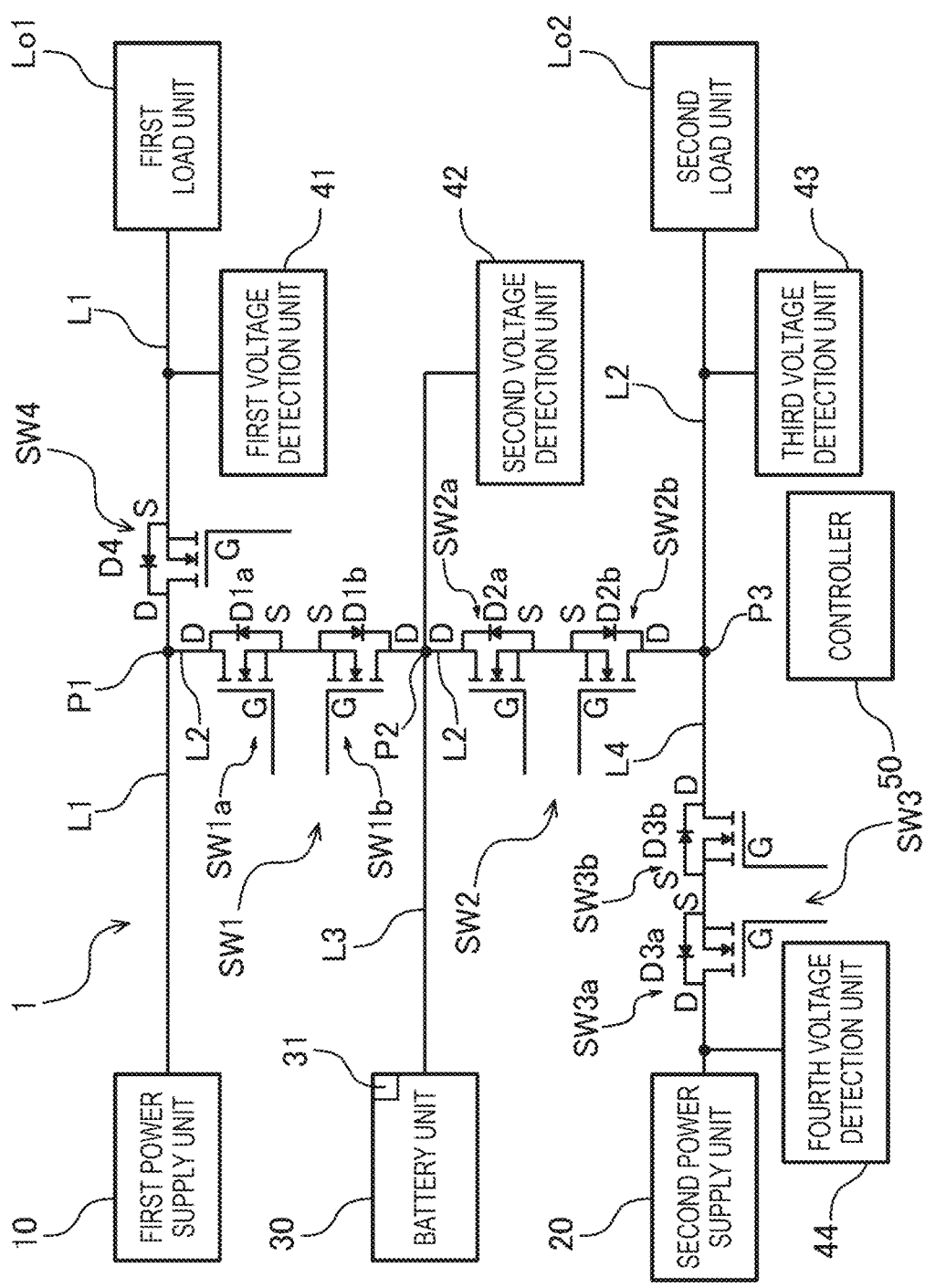
FIG. 1 is a configuration diagram showing a vehicle power supply system according to a first embodiment.

FIG. 1 is a configuration diagram showing a vehicle power supply system according to a first embodiment. A vehicle power supply system 1 shown in FIG. 1 is mounted on, for example, a vehicle capable of autonomous driving, and is for supplying electric power to a first load unit Lo1 and a second load unit Lo2 which are mounted on the vehicle. The vehicle power supply system 1 includes, in addition to the first load unit Lo1 and the second load unit Lo2, a first power supply unit (vehicle power supply unit) 10, a second power supply unit 20, a battery unit (power storage unit) 30, and first to fourth voltage detection units 41 to 44. The vehicle power supply system 1 further includes first to fourth switches SW1 to SW4, first to fourth lines L1 to L4, and a controller (control unit) 50.

The first load unit Lo1 includes, for example, auxiliary devices such as an air conditioner and a car navigation device in addition to functions necessary for the vehicle to travel during autonomous driving. The second load unit Lo2 is configured to perform a degenerate function of, such as at least evacuating the vehicle to a safe place during autonomous driving. The first load unit Lo1 and the second load unit Lo2 are not particularly limited to those described above.

Figure 6:
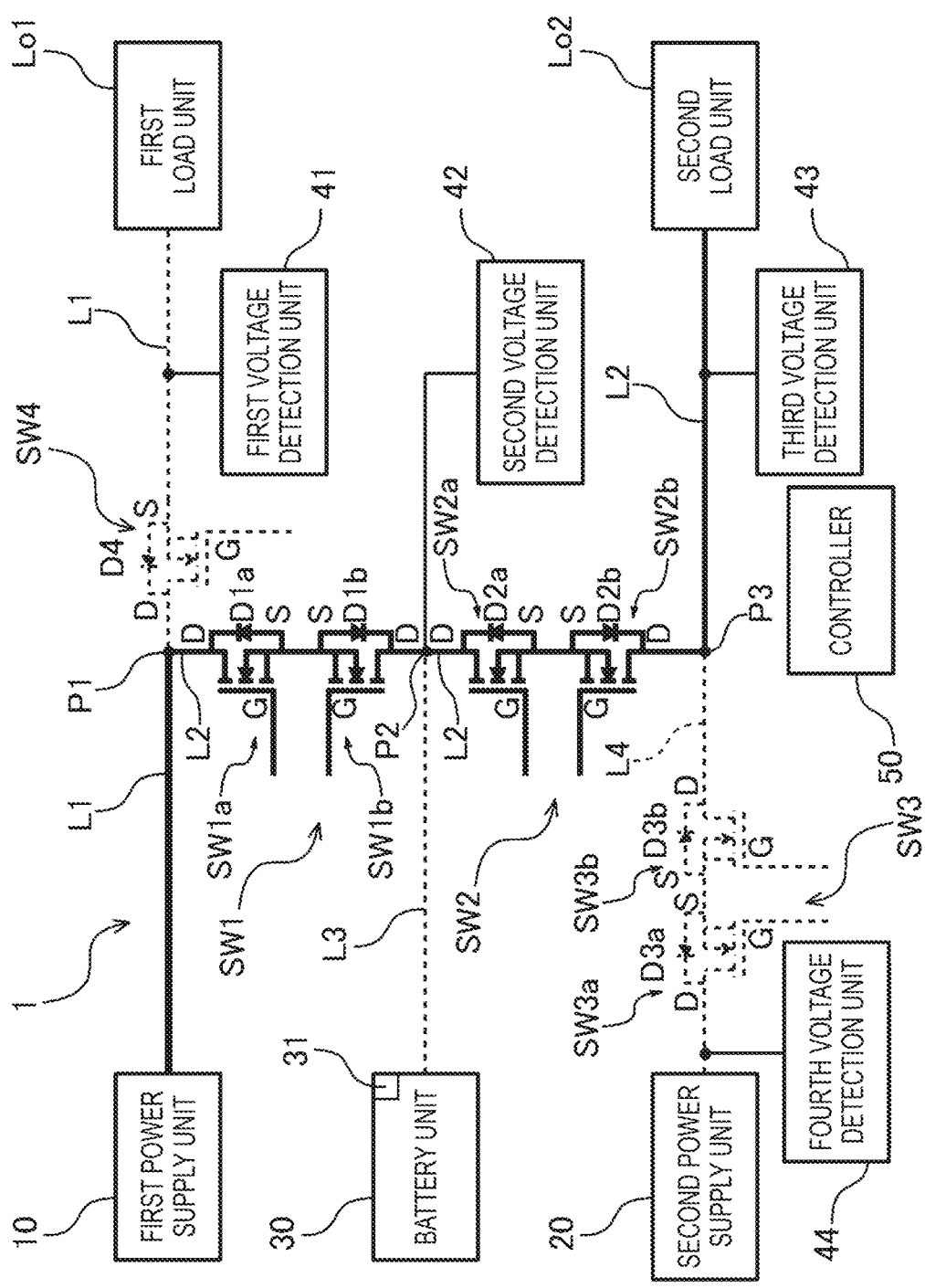
FIG. 6 is a conceptual diagram showing a state of power supply in each operation state, illustrating a state in which a battery unit is abnormal.

The first power supply unit 10 is implemented by a DC/DC converter that receives power from a high-voltage battery mounted on the vehicle and performs power conversion. Similarly to the first power supply unit 10, the second power supply unit 20 is implemented by a DC/DC converter that receives power from the high-voltage battery and performs power conversion. The battery unit 30 is implemented by an electric double layer capacitor, a lithium ion battery, or a lead storage battery, and is charged in advance with electric power from a power supply unit or the like. The battery unit 30 operates as an auxiliary so as not to cause a power shortage when there is a load fluctuation in the first load unit Lo1 or the second load unit Lo2, that is, when the required power of the first load unit Lo1 or the like temporarily increases. As shown in FIG. 6, which will be described later, the first power supply unit 10 is designed to cope with a load fluctuation assumed in the second load unit Lo2 even without the battery unit 30 when electric power is supplied only to the second load unit Lo2.

The first line L1 is a conductive path connecting the first power supply unit 10 and the first load unit Lo1. The second line L2 is a conductive path connecting a branch point P1 on the first line L1 and the second load unit Lo2.

The first switch SW1 is provided on the second line L2 and is configured to turn on and off the second line. The second switch SW2 is provided in series on the second line L2 closer to the second load unit Lo2 than the first switch SW1, and is configured to turn on and off the second line. The first switch SW1 and the second switch SW2 are connected via a connection point P2.

The first switch SW1 includes two switch units SW1a and SW1b. The second switch SW2 includes two switch units SW2a and SW2b. These switch units SW1a, SW1b, SW2a, and SW2b are implemented by an n-type metal-oxide-semiconductor field-effect transistor (MOSFET).

One switch unit SW1a of the first switch SW1 has a drain terminal D serving as a first terminal connected to the branch point P1, and a source terminal S serving as a second terminal connected to a source terminal S of the other switch unit SW1b. A gate terminal G serving as a third terminal is configured to receive a gate signal from the controller 50. The one switch unit SW1a has a parasitic diode D1a that allows a current from the source terminal S to the drain terminal D and blocks a current from the drain terminal D to the source terminal S.

The other switch unit SW1b of the first switch SW1 has a drain terminal D serving as a first terminal connected to the connection point P2, and the source terminal S serving as a second terminal connected to the source terminal S of the one switch unit SW1a. A gate terminal G serving as a third terminal is configured to receive a gate signal from the controller 50. The other switch unit SW1b has a parasitic diode D1b that allows a current from the source terminal S to the drain terminal D and blocks a current from the drain terminal D to the source terminal S.

One switch unit SW2a of the second switch SW2 has a drain terminal D serving as a first terminal connected to the connection point P2, and a source terminal S serving as a second terminal connected to a source terminal S of the other switch unit SW2b. A gate terminal G serving as a third terminal is configured to receive a gate signal from the controller 50. The one switch unit SW2a has a parasitic diode D2a that allows a current from the source terminal S to the drain terminal D and blocks a current from the drain terminal D to the source terminal S.

The other switch unit SW2b of the second switch SW2 has a drain terminal D serving as a first terminal connected to the second load unit Lo2 side, and the source terminal S serving as a second terminal connected to the source terminal S of the one switch unit SW2a. A gate terminal G serving as a third terminal is configured to receive a gate signal from the controller 50. The other switch unit SW2b has a parasitic diode D2b that allows a current from the source terminal S to the drain terminal D and blocks a current from the drain terminal D to the source terminal S.

The third line L3 is a conductive path that connects the battery unit 30 and the connection point P2 between the first switch SW1 and the second switch SW2. The fourth line L4 is a conductive path that connects the second power supply unit 20 and a connection point (second connection point) P3 between the second switch SW2 and the second load unit Lo2.

The third switch SW3 is provided on the fourth line L4 and is configured to turn on and off the fourth line. Similarly to the first switch SW1 and the second switch SW2, the third switch SW3 includes two switch units SW3a and SW3b. The two switch units SW3a and SW3b are implemented by an n-type MOSFET.

One switch unit SW3a of the third switch SW3 has a drain terminal D serving as a first terminal connected to the second power supply unit 20, and a source terminal S serving as a second terminal connected to a source terminal S of the other switch unit SW3b. A gate terminal G serving as a third terminal is configured to receive a gate signal from the controller 50. The one switch unit SW3a has a parasitic diode D3a that allows a current from the source terminal S to the drain terminal D and blocks a current from the drain terminal D to the source terminal S.

The other switch unit SW3b of the third switch SW3 has a drain terminal D serving as a first terminal connected to the connection point P3, and the source terminal S serving as a second terminal connected to the source terminal S of the one switch unit SW3a. A gate terminal G serving as a third terminal is configured to receive a gate signal from the controller 50. The other switch unit SW3*b* has a parasitic diode D3*b* that allows a current from the source terminal S to the drain terminal D and blocks a current from the drain terminal D to the source terminal S.

The fourth switch SW4 is provided on the first line L1 between the branch point P1 and the first load unit Lo1, and is configured to turn on and off the first line. The fourth switch SW4 has a drain terminal D serving as a first terminal connected to the branch point P1, and a source terminal S serving as a second terminal connected to the first load unit Lo1. A gate terminal G serving as a third terminal is configured to receive a gate signal from the controller 50. The fourth switch SW4 has a parasitic diode D4 that allows a current from the source terminal S to the drain terminal D and blocks a current from the drain terminal D to the source terminal S.

The first voltage detection unit 41 detects a voltage in the first line L1, and particularly detects a voltage on the first load unit Lo1 side of the fourth switch SW4. The second voltage detection unit 42 detects a voltage in the second line L2, and detects a voltage at the connection point P2. The third voltage detection unit 43 detects a voltage in the second line L2, and detects a voltage on the second load unit Lo2 side of the connection point P3. The fourth voltage detection unit 44 detects a voltage in the fourth line L4, and detects a voltage on the second power supply unit 20 side of the third switch SW3.

The controller 50 performs control to turn on and off the first to fourth switches SW1 to SW4. The controller 50 receives information on detection voltages from the first to fourth voltage detection units 41 to 44, determines a ground fault state (one of abnormal states) of each unit, and performs control to turn on and off the first to fourth switches SW1 to SW4.

For example, it is assumed that the third switch SW3 is off and the other switches SW1, SW2, and SW4 are on. At this time, if there is no ground fault in the first power supply unit 10 or the first load unit Lo1, the first voltage detection unit 41 and the second voltage detection unit 42 detect appropriate voltage values expected in a normal state. In this case, a voltage detected by the first voltage detection unit 41 is higher than a voltage detected by the second voltage detection unit 42. However, if a ground fault occurs in the first power supply unit 10 or the first load unit Lo1 (including the first line L1), the voltage detected by the first voltage detection unit 41 is lower than the voltage detected by the second voltage detection unit 42. In this case, the controller 50 determines that a ground fault abnormality has occurred in the first power supply unit 10 or the first load unit Lo1.

Similarly, for example, it is assumed that the third switch SW3 is off and the other switches SW1, SW2, and SW4 are on. At this time, if there is no ground fault in the second load unit Lo2, the second voltage detection unit 42 and the third voltage detection unit 43 detect appropriate voltage values expected in a normal state. In this case, a difference between a voltage detected by the second voltage detection unit 42 and a voltage detected by the third voltage detection unit 43 is equal to or less than a predetermined threshold. However, if a ground fault occurs in the second load unit Lo2 (including the second line L2 on the second load unit Lo2 side of the connection point P3), the difference between the voltages detected by the two is excessive and exceeds the predetermined threshold. In this case, the controller 50 determines that a ground fault abnormality has occurred in the second load unit Lo2.

For example, if a ground fault does not occur in the second power supply unit 20, the third voltage detection unit

43 and the fourth voltage detection units 44 detect appropriate voltage values expected in a normal state. In this case, a voltage detected by the fourth voltage detection unit 44 is higher than a voltage detected by the third voltage detection unit 43. However, if a ground fault occurs in the second power supply unit 20, the voltage detected by the fourth voltage detection unit 44 is lower than the voltage detected by the third voltage detection unit 43. In this case, the controller 50 determines that a ground fault abnormality has occurred in the second power supply unit 20.

As described above, the controller 50 can determine a ground fault in each unit, and performs control to turn on and off each of the switches SW1 to SW4 according to a state of the ground fault abnormality.

The above is merely an example of the ground fault detection method, and various known and well-known methods may be applied to the ground fault detection method. The controller 50 is not limited to detecting an abnormality in which the voltage drops, such as a ground fault, and may also detect an abnormality on the high voltage side in which the voltage rises to an abnormal value based on information from the voltage detection units 41 to 44. Further, the vehicle power supply system 1 may include a current sensor instead of or in addition to the voltage detection units 41 to 44, and the controller 50 can detect an overcurrent abnormality (including momentary overcurrent caused by a layer short circuit) or the like. In addition, an abnormality such as a ground fault may be determined by functions of the power supply units 10 and 20 and functions of loads included in the load units Lo1 and Lo2, and the controller 50 may determine the abnormality by receiving the information.

Further, the battery unit 30 according to the first embodiment is equipped with a function for detecting an abnormal state by itself, and includes a battery cutoff unit (cutoff unit) 31. When an abnormal voltage is detected based on a voltage sensor or the like included in the battery unit 30, the battery cutoff unit 31 cuts off the connection between the battery unit 30 and the connection point P2. Here, in the first embodiment, it is assumed that the battery cutoff unit 31 can switch between a connection state and a cutoff state, similarly to the first to fourth switches SW1 to SW4. However, the present disclosure is not limited thereto, and the battery cutoff unit 31 may be a fuse that melts down to become the cutoff state when an abnormal voltage is generated on the high voltage side. In addition, the battery unit 30 may not include the battery cutoff unit 31, and the vehicle power supply system 1 may include the battery cutoff unit 31 on the third line L3.

Further, the controller 50 acquires information from the battery unit 30 and determines an abnormality of the battery unit 30. The controller 50 may determine the abnormality of the battery unit 30 based on the information on a detection voltage from the second voltage detection unit 42.

Next, an operation of the vehicle power supply system 1 according to the first embodiment will be described. FIG. 2 is a table showing operation states of the switches SW1 to SW4 in the vehicle power supply system 1 according to the first embodiment. FIGS. 3 to 6 are conceptual diagrams showing states of power supply in the respective operation states. In FIGS. 3 to 6, thick lines indicate that power is supplied, and broken lines indicate that power is not supplied.

Figure 3:
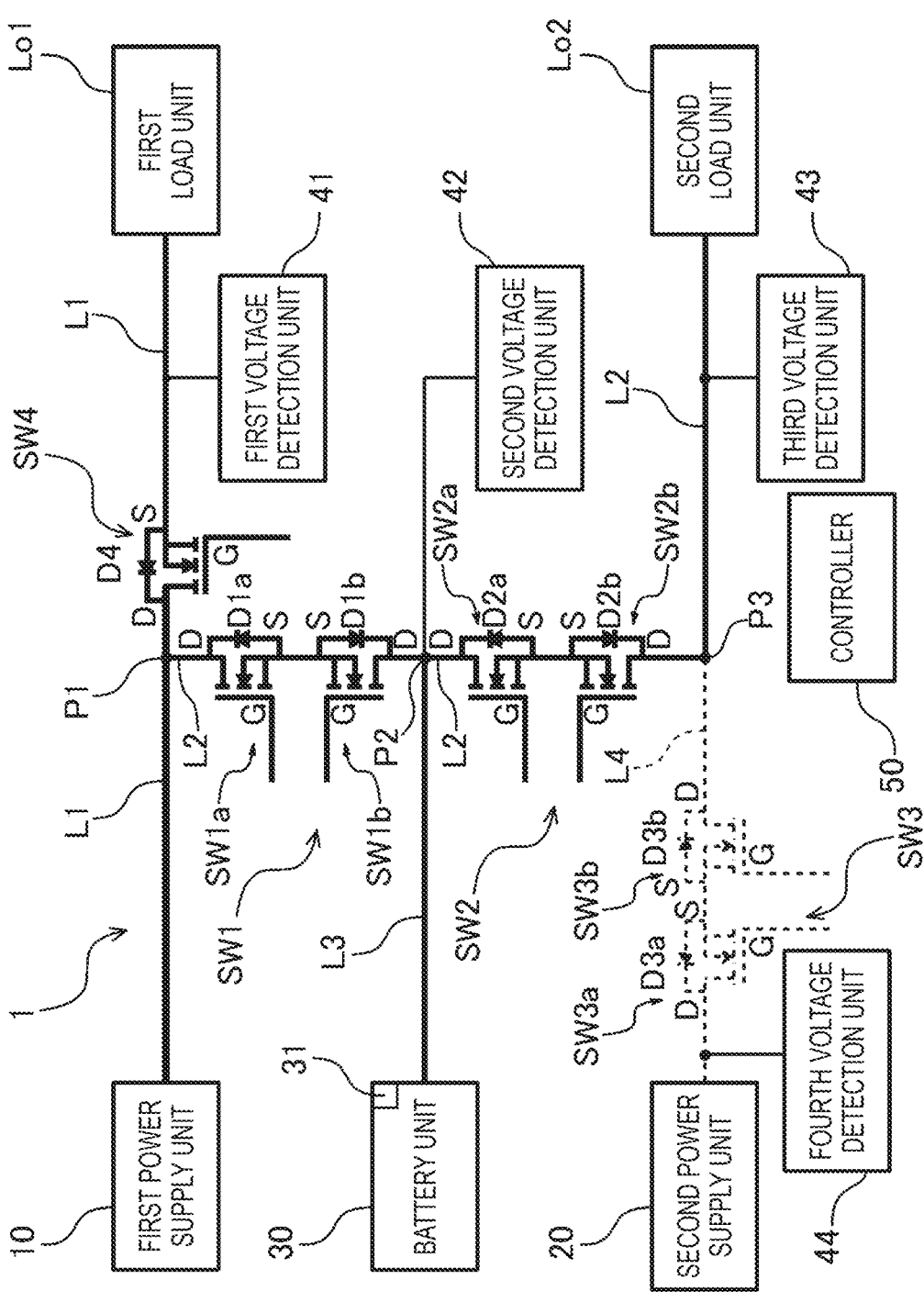
FIG. 3 is a conceptual diagram showing a state of power supply in each operation state, illustrating a normal state.

First, it is assumed that the controller 50 determines that the first power supply unit 10, the first load unit Lo1, the second power supply unit 20, the second load unit Lo2, and the battery unit 30 are in a normal state with no abnormalities. In this case, as illustrated in FIG. 2, the controller 50 sets the first, second, and fourth switches SW1, SW2, and SW4 into a turn-on state (ON), and sets the third switch SW3 into a turn-off state (OFF). As a result, as shown in FIG. 3, the vehicle power supply system 1 supplies electric power from the first power supply unit 10 and the battery unit 30 to the first and second load units Lo1 and Lo2. In this case, the second power supply unit 20 does not operate.

Figure 4:
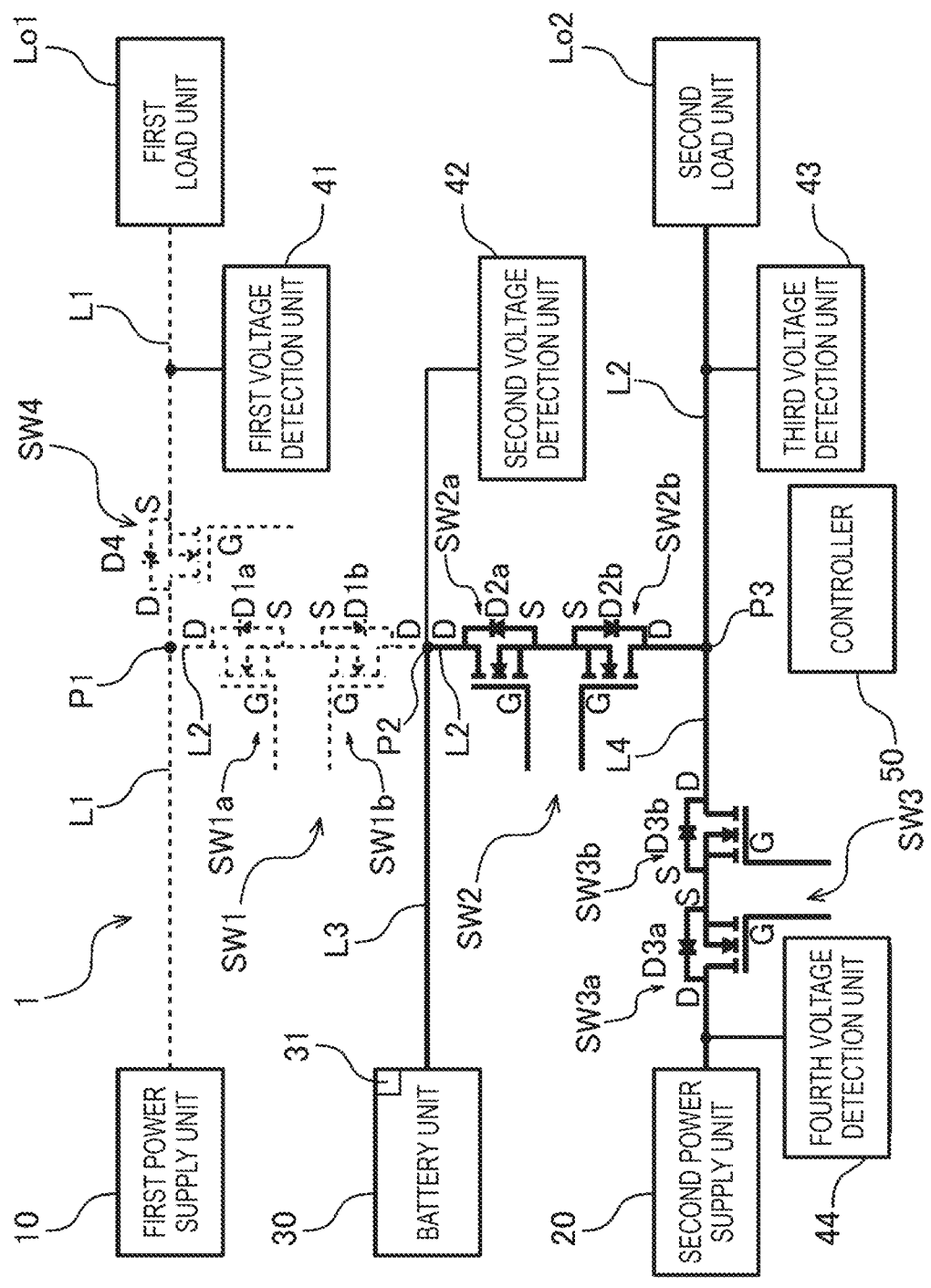
FIG. 4 is a conceptual diagram showing a state of power supply in each operation state, illustrating a first abnormal state.

Further, it is assumed that the controller 50 determines that there is an abnormality in the first power supply unit 10 or the first load unit Lo1 (first abnormal state). In this case, as illustrated in FIG. 2, the controller 50 sets the first switch into the turn-off state, and sets the second to fourth switches SW2 to SW4 into the turn-on state. As a result, as shown in FIG. 4, the vehicle power supply system 1 supplies electric power from the second power supply unit 20 and the battery unit 30 to the second load unit Lo2, and enables evacuation traveling in the autonomous driving vehicle.

The controller 50 may turn off the fourth switch SW4 in the first abnormal state, but it is preferable to turn the fourth switch SW4 on at least when an abnormality occurs in the first load unit Lo1. Each of the loads included in the first load unit Lo1 is usually provided with a fuse or a cutoff switch so as to cope with abnormalities. Therefore, in the vehicle power supply system 1, by turning on the fourth switch SW4 and cutting off only the load in the abnormal state of the first load unit Lo1 in the first abnormal state, the operation of other loads of the first load unit Lo1 can be enabled.

Further, it is assumed that the controller 50 determines that there is an abnormality in the second power supply unit 20 (third abnormal state). In this case, as illustrated in FIG. 2, the controller 50 sets the first, second, and fourth switches SW1, SW2, and SW4 into the turn-on state, and sets the third switch SW3 into the turn-off state. That is, the controller 50 sets each of the switches SW1 to SW4 to states the same as those in the normal state. As a result, as shown in FIG. 3, the vehicle power supply system 1 supplies electric power from the first power supply unit 10 and the battery unit 30 to the first and second load units Lo1 and Lo2.

Figure 5:
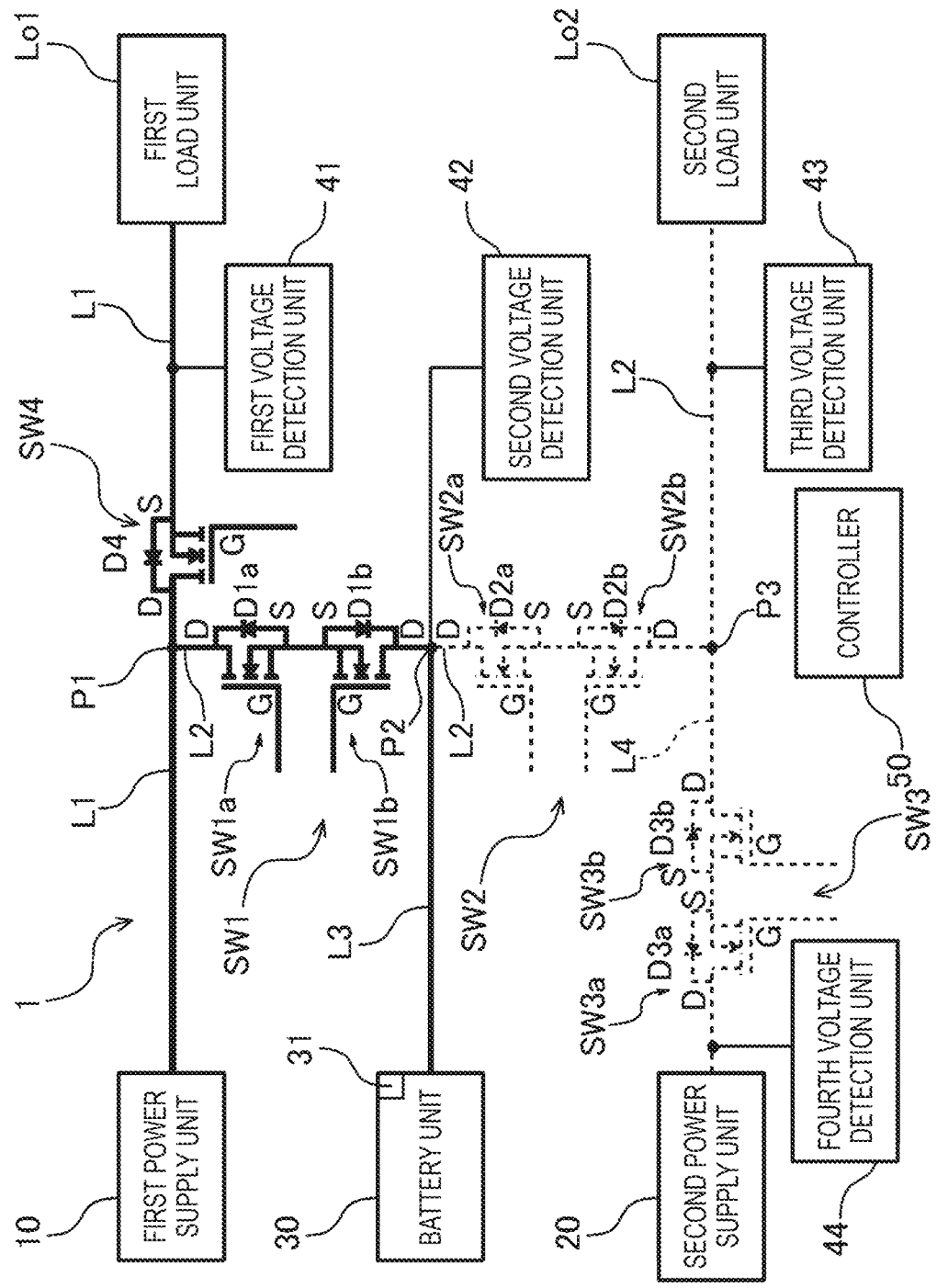
FIG. 5 is a conceptual diagram showing a state of power supply in each operation state, illustrating a second abnormal state.

Further, it is assumed that the controller 50 determines that there is an abnormality in the second load unit Lo2 (second abnormal state). In this case, as illustrated in FIG. 2, the controller 50 sets the first and fourth switches SW1 and SW4 into the turn-on state, and sets the second and third switches SW2 and SW3 into the turn-off state. As a result, as shown in FIG. 5, the vehicle power supply system 1 supplies electric power from the first power supply unit 10 and the battery unit 30 to the first load unit Lo1.

Further, it is assumed that the controller 50 determines that the battery unit 30 is in an abnormal state (battery open) such as overvoltage, overcharge, or overdischarge. In this case, as illustrated in FIG. 2, the controller 50 sets the first and second switches SW1 and SW2 into the turn-on state, and sets the third and fourth switches SW3 and SW4 into the turn-off state. In addition, the battery cutoff unit 31 cuts off the connection between the battery unit 30 and the connection point P2. Accordingly, as illustrated in FIG. 6, the vehicle power supply system 1 supplies electric power from the first power supply unit 10 to the second load unit Lo2.

In this way, the vehicle power supply system 1 according to the first embodiment supplies electric power from the first power supply unit 10 and the battery unit 30 to the first and second load units Lo1 and Lo2 in the normal state. Further, the vehicle power supply system 1 supplies electric power from the battery unit 30 to the second load unit Lo2 in the first abnormal state, and supplies electric power from the first power supply unit 10 and the battery unit 30 to the first load unit Lo1 in the second abnormal state. Therefore, the vehicle power supply system 1 supplies electric power from the battery unit 30 to the load side in any of the normal state, the first abnormal state, and the second abnormal state. Therefore, the battery unit 30 is shared by a power supply system in the normal state and a power supply system in the abnormal state, it is not necessary to provide a dedicated battery for dealing with the abnormal state, and it is possible to provide the vehicle power supply system 1 with a more simplified configuration.

The vehicle power supply system 1 according to the first embodiment further includes the battery cutoff unit 31 that cuts off the connection between the battery unit 30 and the connection point P2 when an abnormal voltage is generated in the battery unit 30. Accordingly, the battery unit 30 can be disconnected from the load units Lo1 and Lo2 when an abnormality occurs in the battery unit 30, and it is possible to prevent a situation in which an abnormal voltage of the battery unit 30 affects the entire system.

The vehicle power supply system 1 according to the first embodiment includes the second power supply unit 20, and in the first abnormal state, the third switch SW3 is turned on to supply electric power from the second power supply unit 20 and the battery unit 30 to the second load unit Lo2. Therefore, in the first abnormal state, the vehicle power supply system 1 supplies electric power not only from the battery unit 30 to the second load unit Lo2 but also from the second power supply unit 20 to the second load unit Lo2. Accordingly, unlike a case where the second load unit Lo2 is supplied with electric power only by the battery unit 30, the battery unit 30 does not need to have a relatively large capacity, and this contributes to reducing the capacity of the battery unit 30.

In addition, since the battery unit 30 is an electric double layer capacitor, a lithium ion battery, or a lead storage battery, any of these can cope with load fluctuations of the first load unit Lo1 and the second load unit Lo2, and can contribute to driving the load appropriately.

Next, a vehicle power supply system according to a second embodiment will be described. The vehicle power supply system according to the second embodiment is similar as that of the first embodiment, except for a part of configuration. Hereinafter, differences from the first embodiment will be described.

Figure 7:
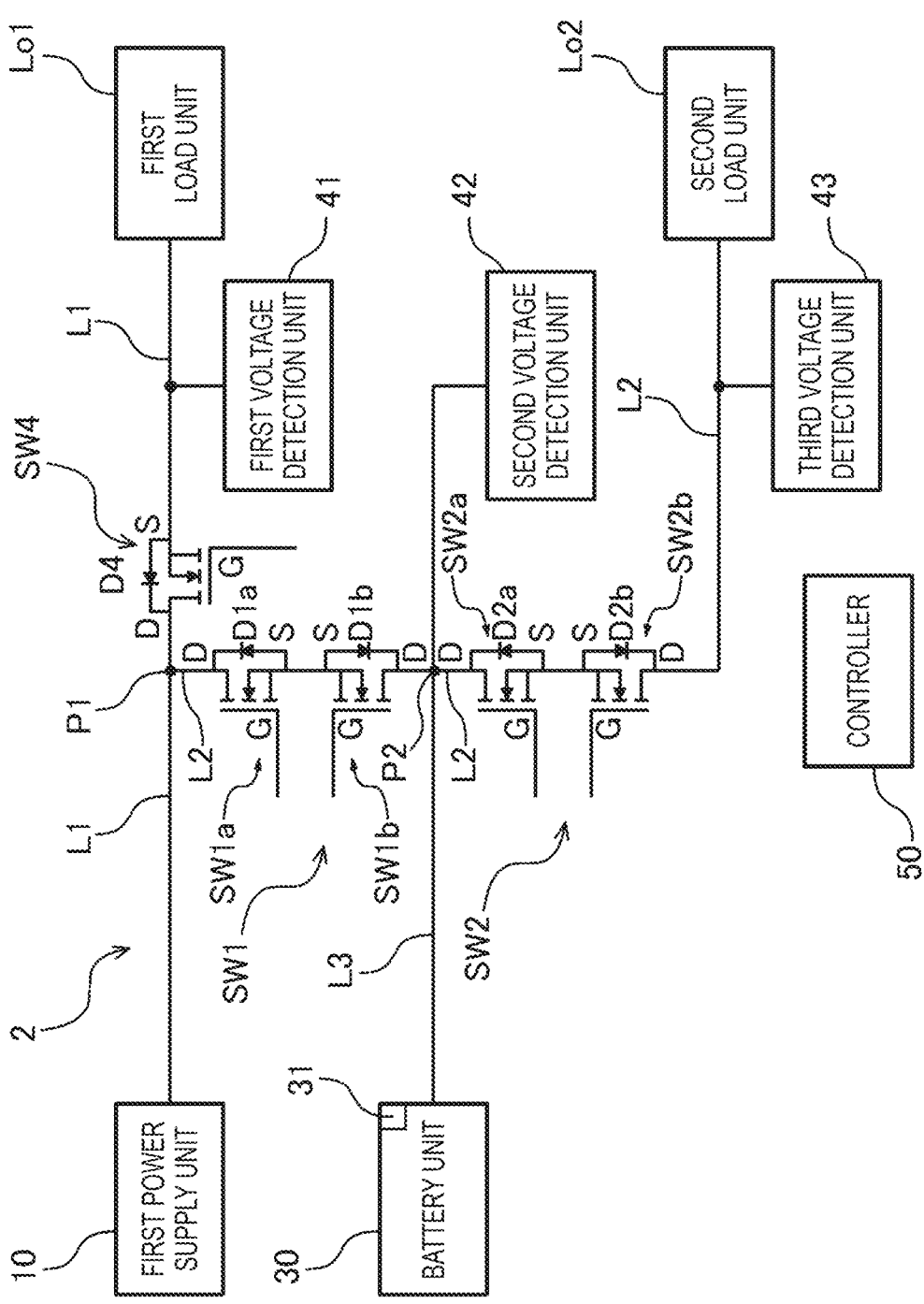
FIG. 7 is a configuration diagram showing a vehicle power supply system according to a second embodiment.

FIG. 7 is a configuration diagram showing the vehicle power supply system according to the second embodiment. As illustrated in FIG. 7, a vehicle power supply system 2 according to the second embodiment has a structure in which the second power supply unit 20, the fourth line L4, and the third switch SW3 are removed from that of the first embodiment. In the second embodiment, the battery unit 30 has a capacity larger than that of the first embodiment. Therefore, the battery unit 30 according to the second embodiment may be an electric double layer capacitor or a lead storage battery, but is preferably a lithium ion battery. Further, the first power supply unit 10 is not limited to a DC/DC converter, and may be implemented by another power converter such as an AC/DC converter that receives electric power from a generator and performs conversion.

FIG. 8 is a table showing operation states of the switches SW1, SW2, and SW4 in the vehicle power supply system 2 according to the second embodiment. FIGS. 9 to 12 are conceptual diagrams showing states of power supply in respective operation states in the second embodiment. In FIGS. 9 to 12, thick lines indicate that power is supplied, and broken lines indicate that power is not supplied.

First, it is assumed that the controller 50 determines that the first power supply unit 10, the first load unit Lo1, the

Figure 9:
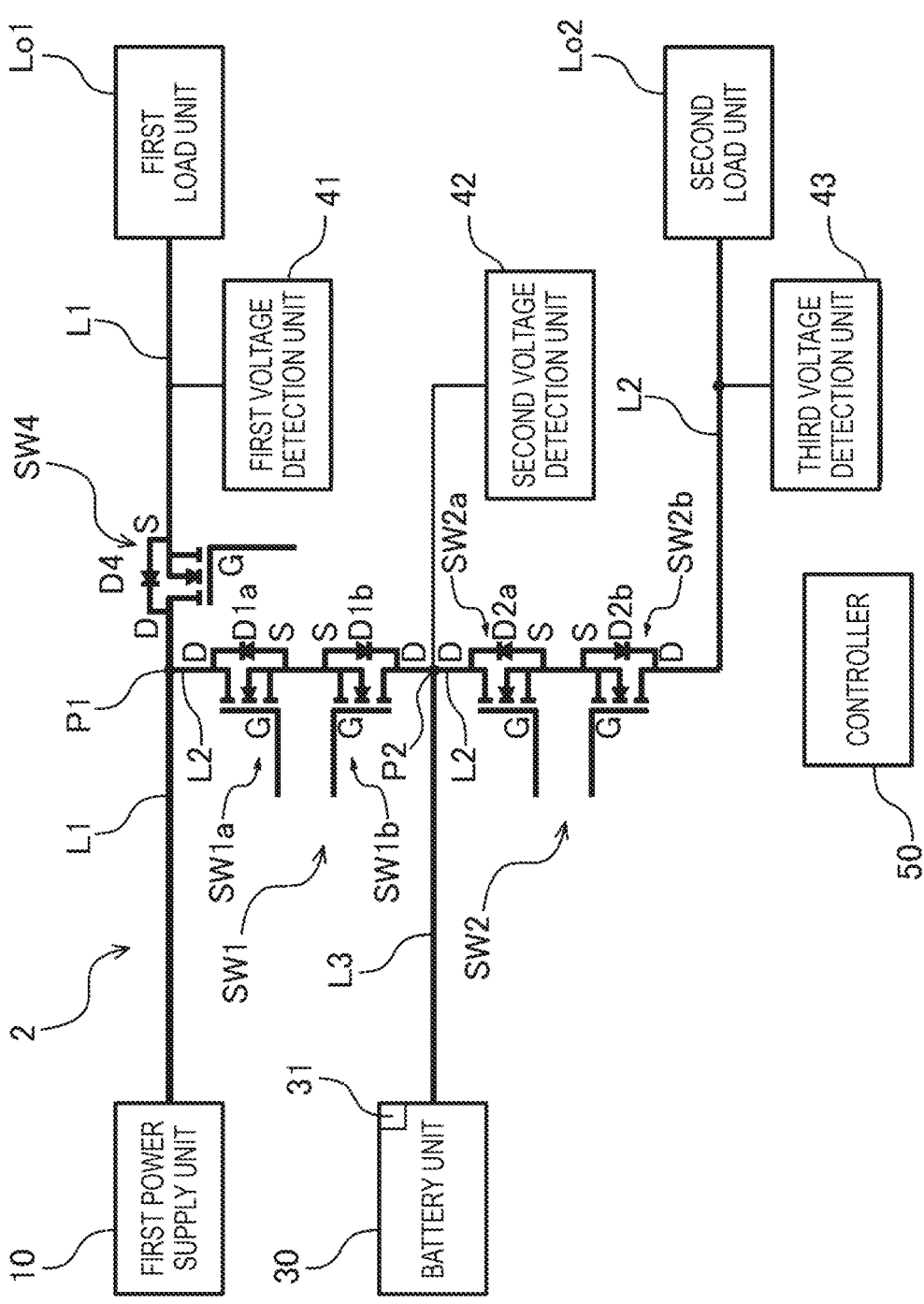
FIG. 9 is a conceptual diagram showing a state of power supply in each operation state in the second embodiment, illustrating a normal state.

9 second load unit Lo2, and the battery unit 30 are in a normal state with no abnormalities. In this case, as illustrated in FIG. 8, the controller 50 sets all the switches SW1, SW2, and SW4 into the turn-on state. As a result, as shown in FIG. 9, the vehicle power supply system 2 supplies electric power from the first power supply unit 10 and the battery unit 30 to the first and second load units Lo1 and Lo2.

Figure 10:
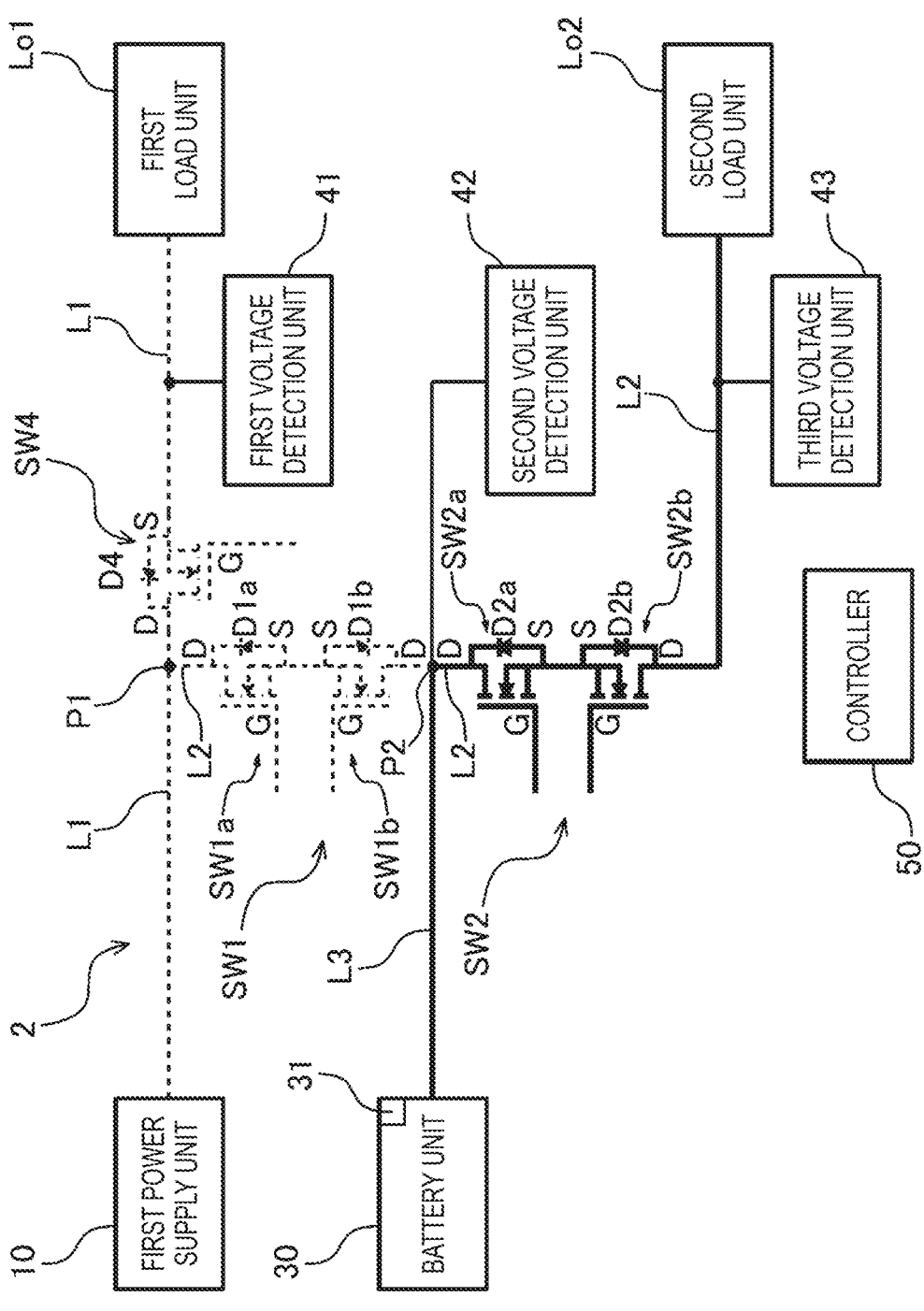
FIG. 10 is a conceptual diagram showing a state of power supply in each operation state in the second embodiment, illustrating a first abnormal state.

Further, it is assumed that the controller 50 determines that there is an abnormality in the first power supply unit 10 or the first load unit Lo1 (first abnormal state). In this case, as illustrated in FIG. 8, the controller 50 sets the first switch into the turn-off state, and sets the second and fourth switches SW2 and SW4 into the turn-on state. The controller 50 may set the fourth switch SW4 to the turn-off state. As a result, as shown in FIG. 10, the vehicle power supply system 2 supplies electric power from the battery unit 30 to the second load unit Lo2, and enables evacuation traveling in the autonomous driving vehicle.

Figure 11:
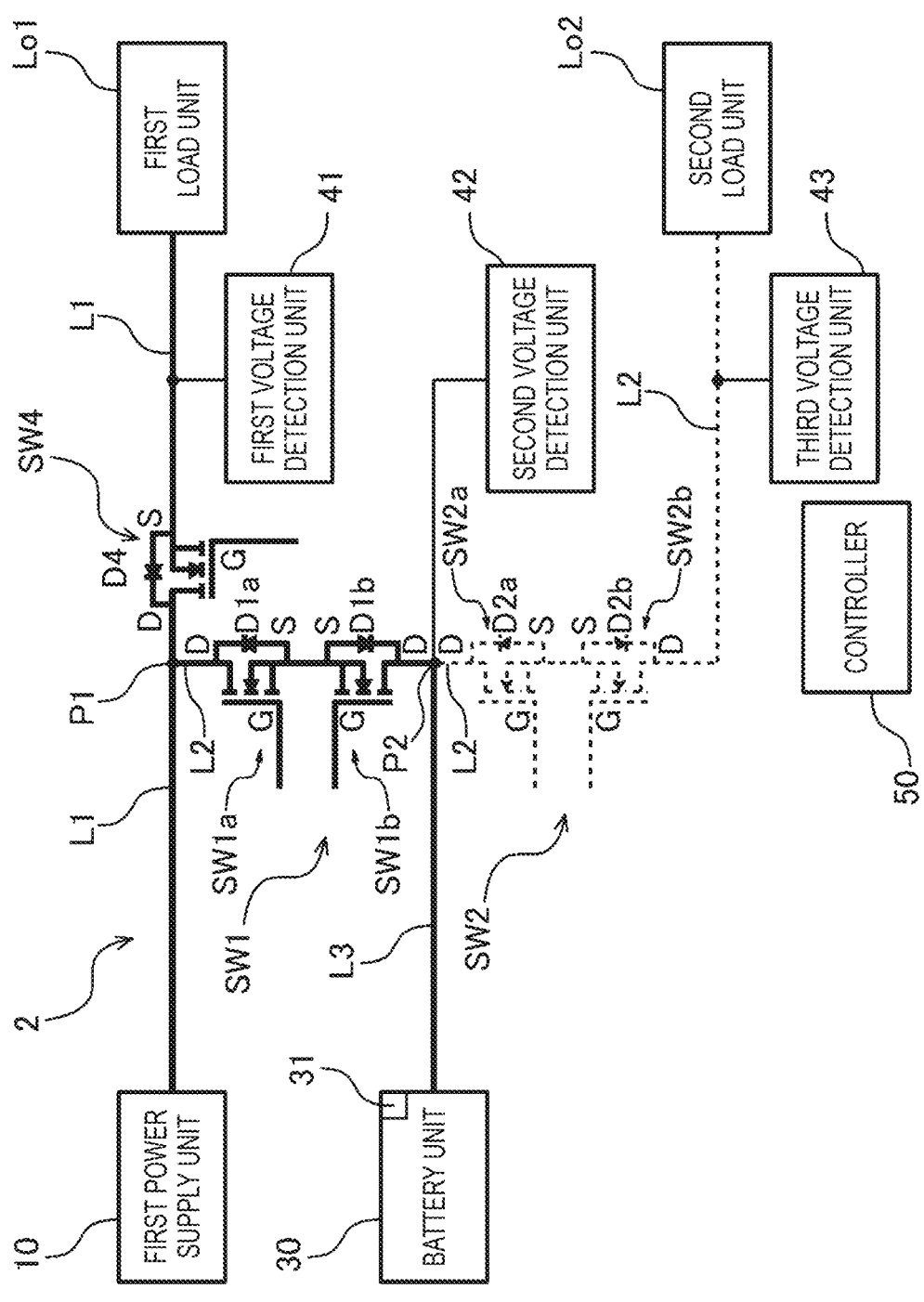
FIG. 11 is a conceptual diagram showing a state of power supply in each operation state in the second embodiment, illustrating a second abnormal state.

Further, it is assumed that the controller 50 determines that there is an abnormality in the second load unit Lo2 (second abnormal state). In this case, as illustrated in FIG. 8, the controller 50 sets the first and fourth switches SW1 and SW4 into the turn-on state and sets the second switch SW2 into the turn-off state. As a result, as shown in FIG. 11, the vehicle power supply system 2 supplies electric power from the first power supply unit 10 and the battery unit 30 to the first load unit Lo1.

Figure 12:
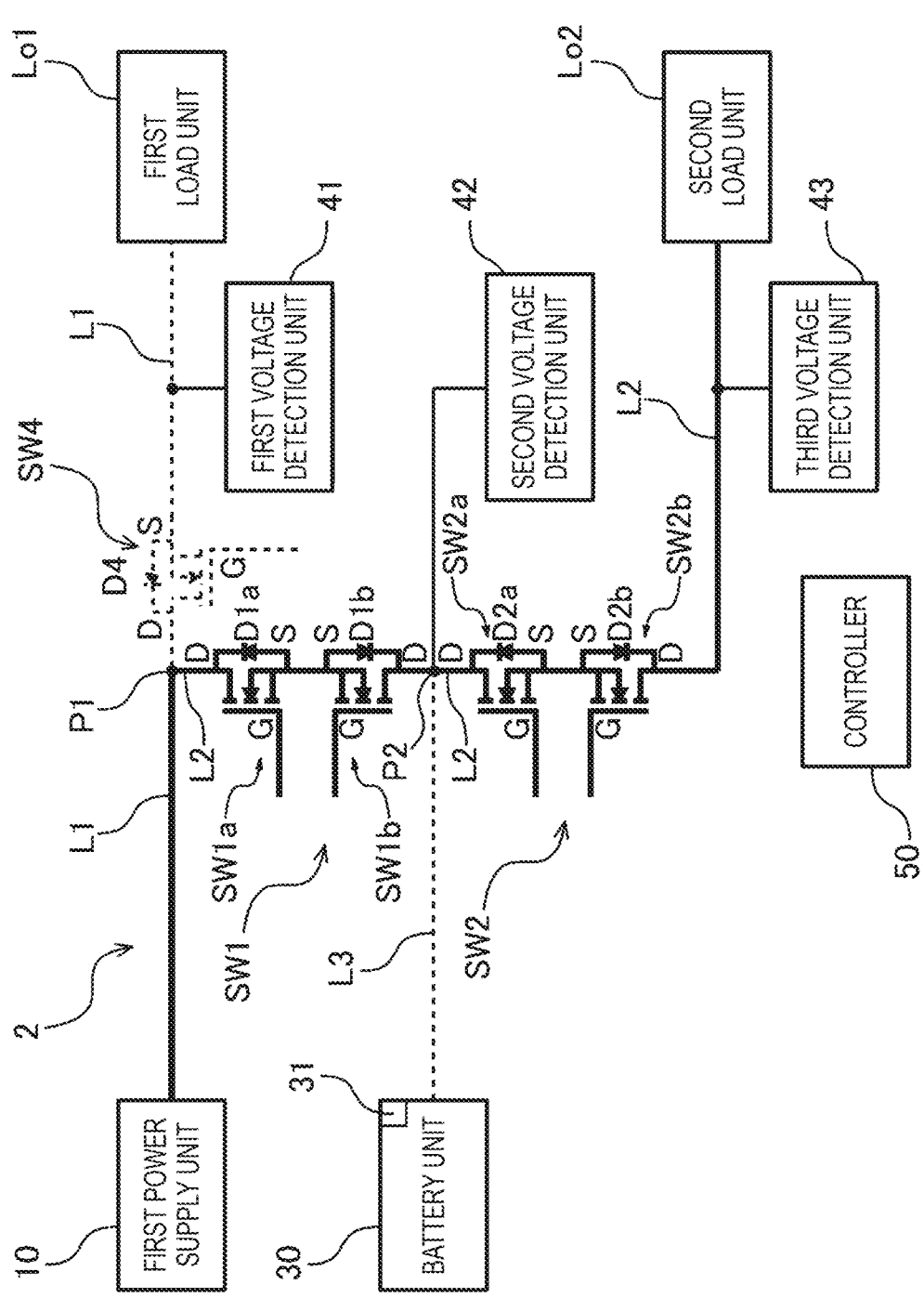
FIG. 12 is a conceptual diagram showing a state of power supply in each operation state in the second embodiment, illustrating a state in which a battery unit is abnormal.

Further, it is assumed that the controller 50 determines that the battery unit 30 is in an abnormal state (battery open). In this case, as illustrated in FIG. 8, the controller 50 sets the first and second switches SW1 and SW2 into the turn-on state and sets the fourth switch SW4 into the turn-off state. Accordingly, as illustrated in FIG. 12, the vehicle power supply system 2 supplies electric power from the first power supply unit 10 to the second load unit Lo2.

In this way, similarly to the first embodiment, the vehicle power supply system 2 according to the second embodiment is in a state in which electric power is supplied from the battery unit 30 to the load side in any of the normal state, the first abnormal state, and the second abnormal state. Therefore, the battery unit 30 is shared by a power supply system in the normal state and a power supply system in the abnormal state. Therefore, it is possible to provide the vehicle power supply system 2 with a more simplified configuration. In particular, since the vehicle power supply system 2 according to the second embodiment does not include the second power supply unit 20, it is possible to further simplify the configuration by reducing the number of power supply units.

In the vehicle power supply system 2 according to the second embodiment, similarly to the first embodiment, the battery unit 30 can be disconnected from the load units Lo1 and Lo2 when an abnormality occurs in the battery unit 30. As a result, it is possible to prevent the abnormal voltage of the battery unit 30 from affecting the entire system.

In addition, in the second embodiment, since the battery unit 30 is also an electric double layer capacitor, a lithium ion battery, or a lead storage battery, any of these can cope with load fluctuations, and can contribute to driving the load appropriately. In the second embodiment, the battery unit 30 is preferably a lithium ion battery.

Although the disclosure has been described above based on the embodiments, the disclosure is not limited to the above embodiments, modifications may be made without departing from the gist of the disclosure, and techniques according to the embodiments and publicly known or well-known techniques may be combined within a possible range.

For example, in the above embodiments, the vehicle power supply system 1 and 2 has been described with the assumption of an autonomous driving vehicle. However, the present disclosure is not limited thereto, and the vehicle power supply system 1 and 2 may be applied during manual driving of an autonomous driving vehicle, or during power supply in a vehicle that does not originally have an autonomous driving function. Furthermore, the first load unit Lo1 and the second load unit Lo2 may be changed between during autonomous driving and during manual driving. For example, when it is raining, the wiper is not important during autonomous driving, but is very important during manual driving. Therefore, the wiper may be set as the second load unit Lo2 during autonomous driving and as the first load unit Lo1 during manual driving.

Further, in the above embodiments, the vehicle power supply system 1, 2 supplies electric power to the first load unit Lo1 in the second abnormal state in which the second load unit Lo2 is abnormal. In this case, the controller 50 may supply power to only a part of the first load unit Lo1 to perform evacuation traveling.

In the above embodiments, each of the switches SW1 to SW4 includes an n-type MOSFET. However, each of the switches SW1 to SW4 is not particularly limited to the above-described configuration as long as they can be turned on and off, and may be configured to include other switch units such as a p-type MOSFET, a relay switch, and a transistor.

Figure 13:
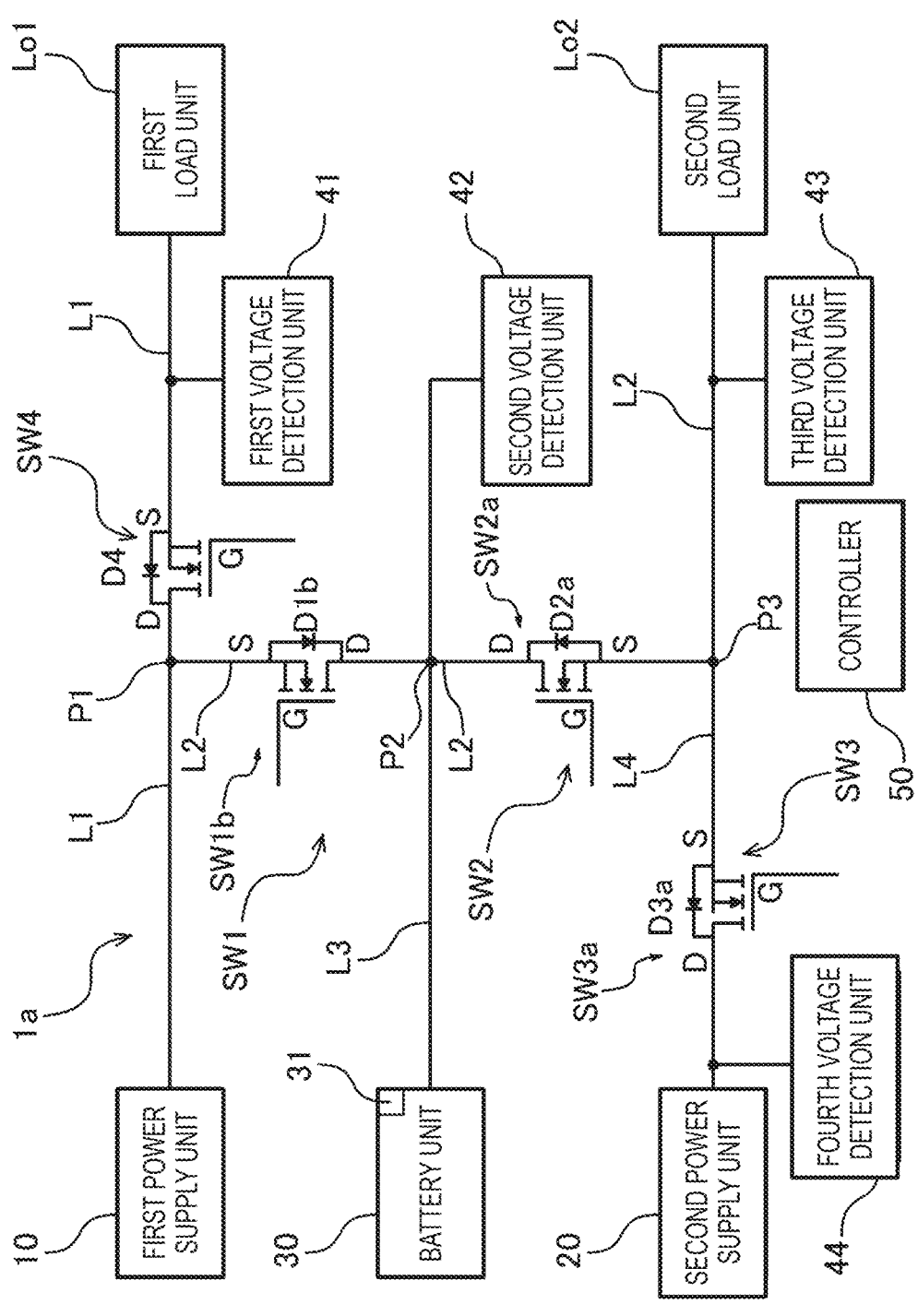
FIG. 13 is a configuration diagram showing a vehicle power supply system according to a modification of the first embodiment.

In addition, the first to third switches SW1 to SW3 are implemented by bidirectional cutoff switches in which the source terminals S are connected to each other, but are not particularly limited thereto, and may be implemented by one n-type MOSFET. FIG. 13 is a configuration diagram showing a vehicle power supply system according to a modification of the first embodiment. As illustrated in FIG. 13, in a vehicle power supply system 1a according to the modification, the first switch SW1 does not include the first switch unit SW1a, and includes only the second switch unit SW1b. Similarly, in the vehicle power supply system 1a according to the modification, the second switch SW2 does not include the second switch unit SW2b, and includes only the first switch unit SW2a. Further, the third switch SW3 does not include the second switch unit SW3b, and includes only the first switch unit SW3a. This is because, even with such a configuration, there is no problem in cutting off the path as in FIGS. 3 to 6. FIG. 13 shows the switch configuration according to the first embodiment, but it may also be applied to the first and second switches SW1 and SW2 according to the second embodiment.

Here, as illustrated in FIGS. 1 and 7, when the first switch SW1 includes the first switch unit SW1a and the second switch unit SW1b, and the second switch SW2 includes the first switch unit SW2a and the second switch unit SW2b, it is possible to cope with a high voltage abnormality of the first power supply unit 10 and the second power supply unit 20 (limited to the configuration of FIG. 1). That is, it is assumed that the first power supply unit 10 outputs a voltage higher than a design value due to a failure. In this case, the first switch unit SW1a and the second switch unit SW1b of the first switch SW1 are both turned off. The first switch unit SW2a and the second switch unit SW2b of the second switch SW2 are both turned on. Accordingly, a high voltage can be prevented from being applied from the first power supply unit 10 to the second load unit Lo2. Further, it is assumed that the second power supply unit 20 outputs a voltage higher than a design value due to a failure. In this case, the first switch unit SW2a and the second switch unit SW2*b* of the second switch SW2 are both turned off. The first switch unit SW1*a* and the second switch unit SW1*b* of the first switch SW1 are both turned on. Accordingly, a high voltage can be prevented from being applied from the second power supply unit 20 to the first load unit Lo1.

What is claimed is:

1. A vehicle power supply system that supplies electric power to a first load unit and a second load unit which are mounted on a vehicle, the vehicle power supply system comprising:

a first line that connects the first load unit and a vehicle power supply unit for supplying electric power;

a second line that connects the first line and the second load unit;

a first switch that is arranged on the second line and that turns on and off the second line;

a second switch that is arranged in series on the second line closer to the second load unit than the first switch and that turn on and off the second line;

a third line that connects a power storage unit in which electric power is stored in advance and a connection point between the first switch and the second switch; and a control unit that controls the first switch and the second switch to be turned on and off, wherein in a normal state in which it is determined that there is no abnormality in the vehicle power supply unit, the first load unit, and the second load unit, the control unit turns on the first switch and the second switch so as to supply electric power from the vehicle power supply unit and the power storage unit to the first load unit and the second load unit, in a first abnormal state in which it is determined that there is an abnormality in the vehicle power supply unit or the first load unit, the control unit turns off the first switch and turns on the second switch so as to supply electric power from the power storage unit to the second load unit, and in a second abnormal state in which it is determined that there is an abnormality in the second load unit, the control unit turns on the first switch and turns off the second switch so as to supply electric power from the vehicle power supply unit and the power storage unit to the first load unit.

2. The vehicle power supply system according to claim 1, wherein the control unit further includes a cutoff unit that cuts off connection between the power storage unit and the connection point when an abnormal voltage is generated in the power storage unit.

3. The vehicle power supply system according to claim 1, further comprising:

a fourth line that connects a second power supply unit for supplying electric power and a second connection point between the second switch and the second load unit in the second line; and a third switch that is arranged in the fourth line and that turns on and off the fourth line, wherein in the normal state and the second abnormal state, the control unit turns off the third switch, and in the first abnormal state, the control unit turns on the third switch so as to supply electric power from the second power supply unit and the power storage unit to the second load unit.

4. The vehicle power supply system according to claim 1, wherein the power storage unit is an electric double layer capacitor, a lithium ion battery, or a lead storage battery.

* * * * *